(12) United States Patent
Bjelajac et al.

(10) Patent No.: US 11,794,283 B2
(45) Date of Patent: Oct. 24, 2023

(54) ADAPTER FOR LASER CUTTING HEAD

(71) Applicant: II-VI Delaware, Inc., Wilmington, DE (US)

(72) Inventors: Goran Bjelajac, Berlin (DE); Frank Schulze, Berlin (DE)

(73) Assignee: II-VI Delaware, Inc., Wilmington, DE (US)

( * ) Notice: Subject to any disclaimer, the term of this patent is extended or adjusted under 35 U.S.C. 154(b) by 858 days.

(21) Appl. No.: 16/420,750

(22) Filed: May 23, 2019

(65) Prior Publication Data

US 2019/0366483 A1 Dec. 5, 2019

(30) Foreign Application Priority Data

May 29, 2018 (DE) ........................ 202018102990U1

(51) Int. Cl.
*B23K 26/38* (2014.01)
*C04B 35/64* (2006.01)
(Continued)

(52) U.S. Cl.
CPC .............. *B23K 26/38* (2013.01); *B23K 26/04* (2013.01); *C04B 35/64* (2013.01); *H01B 13/067* (2013.01);
(Continued)

(58) Field of Classification Search
CPC ........................... B23K 26/38; B23K 26/1462; B23K 2101/32; B23K 26/048; C04B 35/64; H01B 13/067; G01C 2009/062
See application file for complete search history.

(56) References Cited

U.S. PATENT DOCUMENTS 5,128,508 A * 7/1992 Klingel .............. B23K 26/1482
219/121.72
6,025,571 A 2/2000 Walters et al.
(Continued)

FOREIGN PATENT DOCUMENTS

CA 2343722 A1 * 9/2000
CN 2097057 U * 2/1992
(Continued)

OTHER PUBLICATIONS

Why is the element platinum used for making electrical contacts?, 2017, Quora, https://www.quora.com/Why-is-the-element-platinum-used-for-making-electrical-contacts (Year: 2017).*

*Primary Examiner* — John J Norton
*Assistant Examiner* — Franklin Jefferson Wang
(74) *Attorney, Agent, or Firm* — Wendy W. Koba, Esq.

(57) ABSTRACT

A unitary adapter for attaching a cutting nozzle to a laser cutting head includes an inner cylinder made of ceramic, a conductive shield sintered to the outer sidewall of the ceramic cylinder, a threaded conductive holder (for accepting the cutting nozzle) mounted in an opening at one end of the ceramic cylinder, and a coaxial connector (for connection to external measuring equipment) attached to an opposite end of the ceramic cylinder. A pair of wires is formed to be embedded within the ceramic material and provide separate electrical connections between the coaxial connector and: (1) the threaded holder, and (2) the conductive shield. The various components are sintered to the ceramic body to form permanent attachments, creating a unitary structure less susceptible to the high levels of acceleration and elevated temperatures associated with the laser cutting process.

9 Claims, 2 Drawing Sheets

(51) Int. Cl.
   *H01B 13/06* (2006.01)
   *B23K 26/04* (2014.01)
   *B23K 26/14* (2014.01)
   *B23K 101/32* (2006.01)

(52) U.S. Cl.
   CPC ...... *B23K 26/1462* (2015.10); *B23K 2101/32* (2018.08)

(56) References Cited

U.S. PATENT DOCUMENTS

| | | | |
|---|---|---|---|
| 7,067,085 B1 * | 6/2006 | Sugawara | C04B 35/195 501/118 |
| 9,073,147 B2 | 7/2015 | Broger | |
| 2013/0235508 A1 * | 9/2013 | Kim | H01G 4/30 361/301.4 |
| 2019/0015931 A1 | 1/2019 | Kogel-Hollacher et al. | |

FOREIGN PATENT DOCUMENTS

| | | | | |
|---|---|---|---|---|
| CN | 102029470 A | * | 4/2011 | ............ B23K 26/02 |
| CN | 206966872 U | * | 2/2018 | |
| DE | 4201640 C1 | * | 2/1993 | ............ B23K 26/04 |
| DE | 4426458 A1 | * | 2/1996 | ........ B23K 26/1476 |
| JP | 05146889 A | * | 6/1993 | ............ B05B 12/08 |
| JP | 10249567 A | * | 9/1998 | |
| JP | 2008107149 A | * | 5/2008 | |
| KR | 2016077469 A | * | 7/2016 | |

\* cited by examiner

ADAPTER FOR LASER CUTTING HEAD

CROSS-REFERENCE TO RELATED APPLICATIONS

This application claims priority to German Utility Model No. DE 20 2018 102 990 U1 filed on May 29, 2018, registered on Jun. 6, 2018, and published on Jul. 12, 2018. The aforementioned application is hereby incorporated by reference in its entirety.

TECHNICAL FIELD

The present invention relates to an adapter for a laser cutting head and, more particularly, to an adapter that reduces the influence of environmental factors (e.g., movement/acceleration, temperature, vibration, etc.) on capacitance measurements used to control gap spacing.

BACKGROUND OF THE INVENTION

Laser cutting heads are a part of systems that use a laser beam to perform cutting operations on sheets of different materials (typically, different types of metals and metallic compounds). One aspect of the laser cutting process requires precise control of the cutting head, particularly control of the gap between the tip of the cutting head's nozzle (where the laser beam exits) and the surface of the material being cut (referred to at times as the "workpiece"). For this purpose, optics and a sensor for controlling the cutting process are provided as a component of the laser cutting apparatus.

In general terms, the laser cutting head functions to convert the energy of an included high-power laser source (typically a $CO_2$ or YAG laser) into a power that is able to cut through a metal sheet in a precise, controlled manner. The cutting head may pass the beam through a series of lenses (and perhaps utilize optical fibers as the guiding path for the beam), focusing the beam into the spot size desired for the cutting process. The focused beam is then directed through a nozzle endpiece of the cutting head and toward the sheet of material. A companion gas (typically nitrogen or oxygen, and referred to at times as a "cutting gas") is delivered to the surface of the sheet alongside the laser beam, and functions to either assist in the melting process (e.g., "oxy-fuel burning process") or literally blow the molten material away from the workpiece.

HIGHYAG® Lasertechnolgie GmbH manufactures a wide variety of laser cutting heads, as needed for different purposes. Each type of cutting head requires the ability to adjust, control, and monitor the gap between the tip of the nozzle and the workpiece surface. One typical system for monitoring (and controlling) the gap is based upon the measurement of a capacitance between the nozzle tip and the workpiece (with the air gap between the two serving as the dielectric for the capacitor). In order to function properly, both the nozzle tip and the workpiece need to be conductive and connected to a voltage source of a measurement system.

In some cases, a component described as an "adapter" is utilized to bring the electrical connection to the nozzle. At least one problem with conventional adapters is that the electrical connection between the adapter and the nozzle is made at the end of the assembly process; that is, after the adapter is positioned within the cutting head and the nozzle inserted into the adapter. Performing this electrical connection and soldering operation has been found to be complex and difficult. Furthermore, particles may be formed during the soldering process and contaminate the nozzle in a manner that introduces defects into the laser cutting process.

Various prior art adapter designs have been based on materials that were found to be a fire hazard in the presence of oxygen (which is one of the cutting gasses typically used in combination with the focused laser beam). Therefore, special measures were required to shield these adapters from the influence of the cutting gas, adding further cost and complexity to the laser cutting apparatus.

Moreover, accurate and reliable capacitance measurements rely on secure and stable placement of the components of the measuring system. Even at the elevated temperatures and accelerated repositioning movements at which the laser cutting systems operate, it is imperative that the components do not move against each other during thermal changes, or as a result of the mechanical movement of the head itself during use. Movement/shift of the measuring system components at elevated temperatures have been found to introduce a thermal drift into the measured capacitance that may result in a poorly-controlled gap spacing between the workpiece and the tip of nozzle on the cutting head.

SUMMARY OF THE INVENTION

One exemplary purpose of the present invention is therefore to provide an adapter for use in a cutting head of a laser cutting apparatus that enables reliable and repeatable procedures for monitoring the gap between the nozzle tip and the sheet of material being cut, and also maintaining the gap within a predetermined tolerance.

In accordance with the teachings of the present invention, a unitary adapter for a laser cutting head is provided where the electrical components required to energize the nozzle of the cutting head are formed as integral components of, and sintered to, a cylindrical ceramic body. In this manner, all of the elements are fixed in place and cannot shift during movement of the cutting head. The presence of the insulative ceramic body also reduces temperature-related drift in the measured capacitance. The electrical components include: a pair of electrical connectors embedded within the material of the cylindrical ceramic body, a threaded holder sintered in place within a first open end of the cylindrical ceramic body, a socket connector sintered in place to a defined exterior portion of the second open end, and an outer shield (ground plane) sintered in place around the outer periphery of the cylindrical ceramic body. The pair of electrical connectors may comprise metal wires that are embedded in place within the ceramic material. The cylindrical shield surrounding the inner ceramic body may be formed of stainless steel.

The socket connector may be configured, in one exemplary embodiment, as a connector for a coaxial cable that is used to connect the electrical components of the unitary adapter to an external measuring system.

In one configuration, the region of cylindrical ceramic body where the socket connector is placed may have a groove formed around its outer wall, and sized to accept a gasket which is to ensure tightness against external influences.

In another design, the cylindrical ceramic body may be outwardly offset in the region where the groove is formed, wherein the outer diameter of the offset is greater than the diameter of the remainder of the cylindrical ceramic body.

With this offset design of the unitary adapter, the outer shield can be positioned to slide in place as a sleeve on the cylindrical ceramic body and then rest upon the offset. The outer shield is then sintered to both the outer surface of the ceramic body and the offset.

One exemplary embodiment of the invention takes the form of a unitary adapter for electrically energizing a cutting nozzle of a laser cutting head to enable capacitive gap measurements. The unitary adapter is formed to include a cylindrical ceramic body having an opening through the center thereof from a first end termination to a second, opposing end termination and a plurality of electrical connection components attached to the ceramic body. In particular, the electrical connection components include the following: a threaded conductive holder sintered to the opening of the cylindrical ceramic body at the first end termination, an outer conductive shield formed as a cylindrical sleeve and disposed around and sintered to the cylindrical ceramic body, a coaxial socket connector located at and sintered to a portion of the second, opposing end termination of the cylindrical ceramic body (the coaxial socket connector including a central conductor and an outer ground shielding layer insulated from the central conductor), and a pair of electrical conductors embedded within and sintered to the cylindrical ceramic body. The pair of electrical conductors include a first conductor disposed to make an electrical connection between the central conductor of the coaxial socket connector and the threaded conductive holder, and a second conductor disposed to make an electrical connection between the outer ground shielding layer of the coaxial socket connector and the outer conductive shield. Thus, the sintered attachment of the plurality of electrical connection components to the cylindrical ceramic body forms a unitary adapter configuration with the plurality of electrical connection components permanently affixed to the cylindrical ceramic body.

In another embodiment, the principles of the present invention are provided in a device for mounting onto a laser cutting head. Here, the device includes a base plate, a unitary adapter for electrically energizing a cutting nozzle of the laser cutting head to enable capacitive gap measurements formed in the manner described above, and a sleeve for securing and fastening the unitary adapter to the base plate.

Yet another embodiment of the present invention takes the form of a method of making a unitary adapter for attachment to a laser cutting head and used to electrically energize a cutting nozzle of the laser cutting head to enable capacitive gap measurements. The method includes the steps of: (1) providing a cylindrical ceramic body electrically energizing a cutting nozzle of a laser cutting head to enable capacitive gap measurements; (2) creating a pair of longitudinal holes through defined locations in the cylindrical ceramic body, a first longitudinal hole defining a location for an electrical connection associated with the cutting nozzle and a second longitudinal hole defining a location for an electrical connection associated with a ground shield; (3) inserting a pair of wires through the pair of longitudinal holes; (4) inserting a conductive threaded holder within the opening of the cylindrical ceramic body at the first end termination; (5) disposing a conductive outer shield as a sleeve around the cylindrical ceramic body; (6) disposing a coaxial socket connector on the second end termination of the cylindrical ceramic body at a location spaced apart from the central opening, the coaxial socket connector disposed so as to contact the pair of wires; and (7) sintering the cylindrical ceramic body such that the pair of wires is permanently embedded within the interior thereof and the conductive threaded holder, the conductive outer shield, and the coaxial socket connector are permanently affixed to an exterior surface thereof.

Still other aspects, features, and advantages of the present invention will be readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and description are to be regards as illustrative in nature, and not as restrictive. Additional objects and advantages of the invention are set forth in part in the description that follows, and in part will be obvious from that description, or may be learned by practice of the invention.

BRIEF DESCRIPTION OF THE DRAWINGS

The invention will now be described on the basis of figures. It will be understood that the embodiments and aspects of the invention described in the figures are only examples and do not limit the protective scope of the claims in any way. The invention is defined by the claims and their equivalents. It will be understood that features of one aspect of a given embodiment of the invention can be combined with a feature of a different aspect or aspects of other embodiments of the invention, in which:

DETAILED DESCRIPTION

The present invention discloses a device for an attachment to a laser processing head utilized for cutting sheets of various materials of different thicknesses. As mentioned above, a critical aspect in the reliability of such cutting processes is the ability to measure and control the spacing (gap) between the tip of the laser cutting head (i.e., the tip of the nozzle of the cutting head) and the workpiece surface. The laser cutting head is formed to include a unitary adapter formed in accordance with the present invention, where the electrical components of the adapter are permanently attached to (e.g., sintered to) a ceramic body.

Although mechanical and other methods may be used to measure this gap, the distance between the workpiece and the nozzle is readily determined by measuring variations in the capacitance in the nozzle/air gap/workpiece configuration without requiring any mechanical contact. To be able to measure the capacitance, an electrically conductive nozzle is required (and therefore must include a surrounding non-conductive housing to insulate the nozzle). The electrically conductive nozzle must also be electrically connected by a conductor (typically through a coaxial cable conductor) to the measuring instrument.

In order to obtain capacitance measurements of the required precision, the teachings of the present invention are directed to the formation of a unitary adapter, where the various electrical components of the measuring system are sintered in place around (or inside of, as the case may be) a cylindrical ceramic body that is utilized as the base element of the unitary adapter. By permanently fixing the various electrical components in place, they will all be secured against movement. In particular, the electrical conductors between the nozzle and the measurement system (via the socket connector and associated coaxial cable) are embedded within the ceramic material and thereby secured in a manner that prevents the conductors from contacting each other. It is also important that the unitary adapter of the present invention excludes movements of the components at high accelerations (up to 18 g, for example) and high temperatures (up to 200° C., for example). The extreme temperatures are common in laser cutting apparatus.

Figure 1:
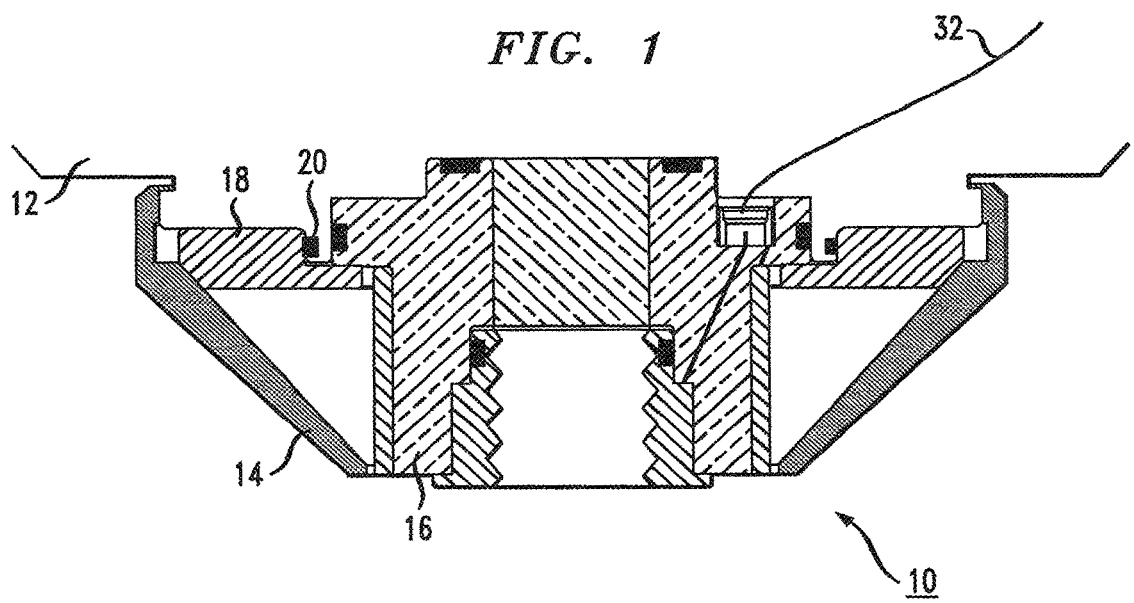
FIG. 1 shows a schematic sectional view of a cutting head device including a unitary adapter formed in accordance with the present invention.

FIG. 1 schematically illustrates a device 10 for mounting on a laser processing head (not shown). Device 10 consists of a base plate 12, a device shield 14 and a unitary adapter 16 formed in accordance with the present invention. Device shield 14 functions as an outer protective element for unitary adapter 16, preventing unitary adapter 16 from exposure to other manufacturing/fabrication elements that may otherwise disrupt its operation and/or damage the attached cutting nozzle (not shown). The embodiment of FIG. 1 also illustrates a retaining ring 18, which serves to fasten unitary adapter 16 to base plate 12. A plurality of gaskets 20 is shown, which are used to seal device 10 against external influences, as well as to prevent intrusion of the cutting gas being used in combination with the focused laser beam.

Figure 2:
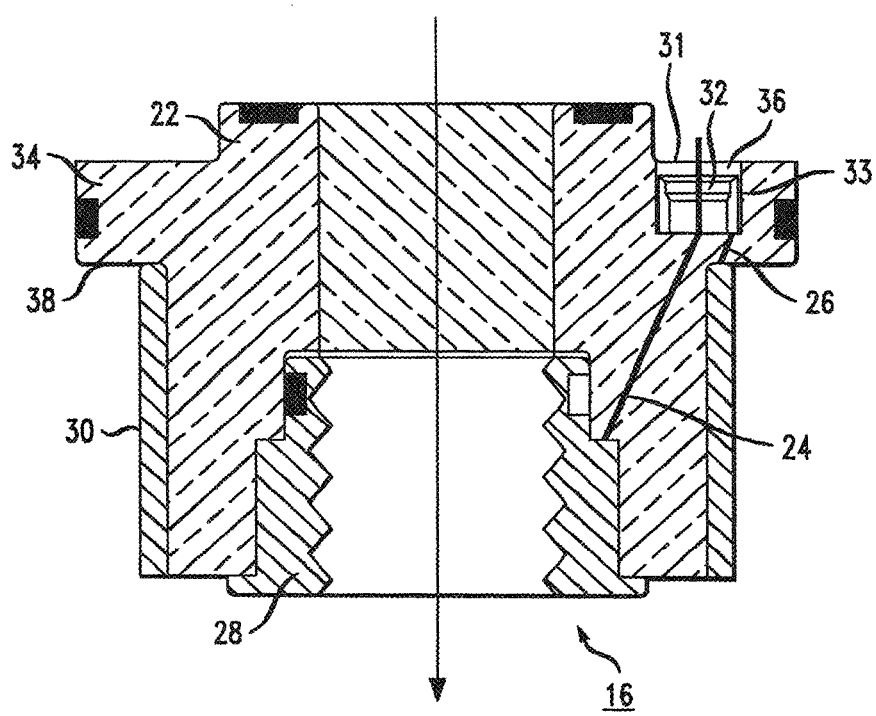
FIG. 2 shows a schematic sectional view of the inventive unitary adapter itself.

FIG. 2 is a cross-section view through unitary adapter 16, illustrating a cylindrical ceramic body 22 that is used as the base element of the inventive adapter. In accordance with the principles of the present invention, the electrical connections between the laser cutting head nozzle and the external measurement system (not shown) are sintered to the outside of (or embedded within) cylindrical ceramic body 22. In this manner, the electrical connections are permanently fixed in place and prevented from moving (even in the presence of "high g" conditions) and are able to function properly in the presence of high temperatures.

In the illustration of FIG. 2, these electrical connections are shown as including at least the following: a pair of electrical conductors (wires) 24, 26, a conductive threaded holder 28, an outer cylindrical shield 30 (also conductive), and a socket connector 32. While not explicitly illustrated in FIG. 2, it is well-understood by those skilled in the art that when fully assembled, a threaded cutting nozzle will engage with threaded holder 28 and direct a laser beam out of the cutting head and toward the workpiece, as indicated by the arrow through the center of unitary adapter 16.

Now referring to the particular elements illustrated in FIG. 2, wires 24, 26 are shown as embedded (sintered) within the ceramic material of ceramic body 22. Therefore, the wires cannot be moved (i.e., remain fixed) and are protected from coming into contact with the cutting gas. In a preferred method of manufacture, a pair of holes is formed through the starting material of cylindrical ceramic body 22, in the locations intended for wires 24, 26. Wires 24, 26 are then inserted through these holes. During the following sintering process, the heating of the ceramic material collapses the holes and thus embeds wires 24, 26 in place. In one exemplary embodiment, wires 24, 26 may be formed of platinum.

As shown, wire 24 is positioned to create an electrical connection between a central conductor 31 of socket connector 32 and threaded holder 28. As mentioned above, socket connector 32 takes the form of a coaxial cable connector, including central conductor 31 and an outer ground conducting layer 33 (with insulating material disposed between conductors 31 and 33). Referring to FIG. 2, it is shown that wire 24 is used to conduct the electrical signal (voltage) along central conductor 31 to threaded holder 28, which is itself formed of a conductive material (for example, stainless steel). In the manner of assembling a laser cutting head, the threaded nozzle component will later be inserted within threaded holder 28 (in particular, screwed in place by the mating threads). As a result, the nozzle is electrified by virtue of the connection established through wire 24 between central conductor 31 and threaded holder 28.

Inasmuch as threaded holder 28 is sintered in place within a first end opening of the cylindrical form of cylindrical ceramic body 22 (referred to as end 22-1), threaded holder 28 (and the attached nozzle) is prevented from moving with respect to the other components of unitary adapter 16.

Wire 26 is positioned within ceramic body 22 as shown in FIG. 2 to create the conduction path between outer ground conductor 33 and outer cylindrical shield 30 as shown in FIG. 2. Outer cylindrical shield 30 takes the form of a sleeve that is designed to slip over and contact the outer surface of cylindrical ceramic body 22. During the following sintering operation, cylindrical shield 30 is permanently fixed in place around ceramic body 22. Shield 30 is preferably formed of stainless steel. Inasmuch as ceramic material is insulative, the combination of threaded holder 28, ceramic body 22, and shield 30 continues to provide the coaxial type of connection arrangement for energizing the attached nozzle, minimizing problems with internal interference and parasitic induction that would other affect the capacitive measurements performed by the associated measurement system.

Socket connector 32 is shown in the example of FIG. 2 as disposed within a recessed portion of ceramic body 22 proximate to its second, opposing open end (referred to as open end 22-2). That is, socket connector 32 is positioned at one end of cylinder form of ceramic body 22 and threaded holder 28 is positioned at the opposite end of the cylinder form. The proper positioning for embedded wires 24, 26 may therefore be defined a priori by knowing the locations of both threaded holder 28 and outer cylindrical shield 30.

As a result of the sintering process of ceramic body 22, wires 24/26, threaded holder 28, shield 30, and socket connector 32 are all fixed in place and cannot move or shift in their position in relation to each other, or in their position relative to other components within unitary adapter 16. Indeed, tests have shown that the arrangement as shown in FIG. 2 remains stable at accelerations up to 18 g, and temperatures in excess of 200° C.

In the particular embodiment illustrated in FIG. 2, cylindrical ceramic body 22 is formed to include an outwardly-directed offset portion 34 formed proximate to second end termination 22-2. Further for this embodiment, socket connector 32 is disposed within a recess 36 formed within offset portion 34. Additionally, outer cylindrical sleeve 30 is shown as disposed along the outer sidewall of ceramic body 22 such that it contacts a lower edge termination 35 of offset portion 34 when fully seated in place. Thereafter, during the sintering process, outer cylindrical sleeve will be permanently affixed to both the sidewall of ceramic body 22 and lower edge termination 34 of offset portion 34. A groove 38 may be formed around the outer periphery of offset portion 34, as shown, and used to support a gasket to seal unitary adapter 16 in place against, for example, retaining ring 18 as shown in FIG. 1.

Figure 3:
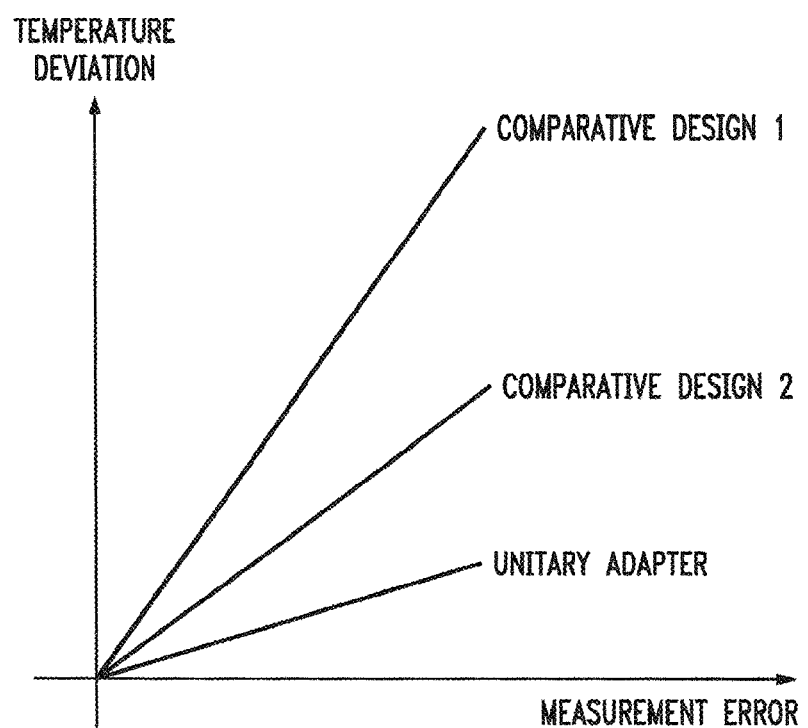
FIG. 3 contains plots showing the reduction of thermal drift in the capacitance measurements for the unitary adapter of the present invention.

FIG. 3 contains graphs that plot capacitance measurement error as a function of change in temperature. These plots show the thermal drift during the cutting process. The measured value deviations are shown as a function of temperature within a device. For a cutting process with nitrogen as the cutting gas, the thermal drift was measured as a 20 mm thick metal sheet was cut. Plot I includes data for a prior art comparative design 1, which utilized a state-of-the-art cutting attachment with a different type of adapter, and plot II has data from yet another prior art configuration. The plot marked "adapter" was achieved using a unitary adapter formed in accordance with the present invention that has the electrical components permanently fixed to the sintered ceramic body of the adapter. By using the unitary adapter according to the present invention, it is shown that the thermal stability of the capacitance measurement is significantly improved.

The foregoing description of the preferred embodiment of the invention has been presented for purposes of illustration and description. It is not intended to be exhaustive or to limit the invention to the precise form disclosed, and modifications and variations are possible in light of the above teachings, or may be acquired from practice of the invention. The embodiment was chosen and described in order to explain the principles of the invention and its practical application to enable one skilled in the art to utilize the invention in various embodiments as are suited to the particular contemplated use. It is intended that the scope of the invention is defined by the claims appended hereto, and their equivalents.

What is claimed is:

1. A unitary adapter for electrically energizing a cutting nozzle of a laser cutting head to enable capacitive gap measurements, the unitary adapter comprising:
    a cylindrical ceramic body having an opening through the center thereof from a first end termination to a second, opposing end termination; and
    a plurality of electrical connection components including:
        a threaded conductive holder sintered to the opening of the cylindrical ceramic body at the first end termination, the sintering forming a permanent connection therebetween;
        an outer conductive shield formed as a cylindrical sleeve, the outer conductive shield disposed around and sintered to the cylindrical ceramic body so as to form a permanent connection therebetween;
        a coaxial socket connector located at and sintered to a portion of the second, opposing end termination of the cylindrical ceramic body so as to form a permanent connection therebetween, the coaxial socket connector including a central conductor and an outer ground shielding layer insulated from the central conductor; and
        a pair of electrical conductors embedded within and sintered to the cylindrical ceramic body to form a permanent connection therebetween, the pair of electrical conductors including a first conductor sintered within a first portion of the cylindrical ceramic body that forms a signal line electrical connection between the central conductor of the coaxial socket connector and the threaded conductive holder, and a second conductor sintered within a second portion of the cylindrical ceramic body that forms a ground plane electrical connection between the outer ground shielding layer of the coaxial socket connector and the outer conductive shield,
    wherein the sintered attachment of the plurality of electrical connection components to the cylindrical ceramic body forms a unitary adapter configuration with the plurality of electrical connection components permanently affixed to the cylindrical ceramic body.

2. The unitary adapter as defined in claim 1, wherein the pair of electrical conductors comprises a pair of wires.

3. The unitary adapter as defined in claim 2, wherein the pair of wires comprises a pair of platinum wires.

4. The unitary adapter as defined in claim 1, wherein the threaded conductive holder is made of stainless steel.

5. The unitary adapter as defined in claim 1, wherein the outer conductive shield is made of stainless steel.

6. The unitary adapter as defined in claim 1, wherein the cylindrical ceramic body includes an outwardly-directed offset portion proximate to the second end termination, creating a region with a larger diameter than the remainder of the ceramic body.

7. The unitary adapter as defined in claim 6, wherein the coaxial socket connector is sintered to a recessed area within the outwardly-directed offset portion so as to form a permanent connection therebetween.

8. The unitary adapter as defined in claim 6, wherein the outwardly-directed offset portion further comprises a groove surrounding the outer periphery 3 thereof, the groove configured to support a gasket to seal the unitary adapter against any cutting gas used by a laser cutting process.

9. The unitary adapter as defined in claim 6, wherein the outer conductive shield is disposed to contact a lower edge termination of the outwardly-directed offset portion, the outer conductive shield sintered to the lower edge termination of the outwardly-directed offset portion so as to form a permanent connection therebetween.

* * * * *